3,503,973
PROCESS FOR PREPARATION OF
PYRAZINOYLGUANIDINES
Edward J. Cragoe, Jr., and Norman P. Gould, Lansdale, Pa., assignors to Merck & Co., Inc., Rahway, N.J., a corporation of New Jersey
No Drawing. Filed Nov. 7, 1967, Ser. No. 681,098
Int. Cl. C07d 51/76
U.S. Cl. 260—250                8 Claims

ABSTRACT OF THE DISCLOSURE

A process is described for the preparation of pyrazinoylguanidines which comprises the reaction of the very reactive 2,5-dioxo-1-pyrrolidinyl 3-aminopyrazinoates with guanidines. The reactive intermediates are prepared from a pyrazinoic acid and N-hydroxysuccinimide through the influence of carbodiimide condensing agents. The products of the process of this invention are useful as diuretic and saluretic agents.

This invention relates to a novel process for the preparation of 3-amino-5,6-disubstituted-pyrazinoylguanidines. In particular it relates to the process wherein a novel 2,5-dioxo-1-pyrrolidinyl 3-amino - 5,6 - disubstituted-pyrazinoate, which forms another embodiment of this invention, is treated with a guanidine to prepare a 3-amino-5,6-disubstituted-pyrazinoylguanidine. While the novel method of this invention can be employed to produce substantially any pyrazinoylguanidine, the reaction is particularly useful in the preparation of products of structural Formula III. The novel process can be represented by the following equation:

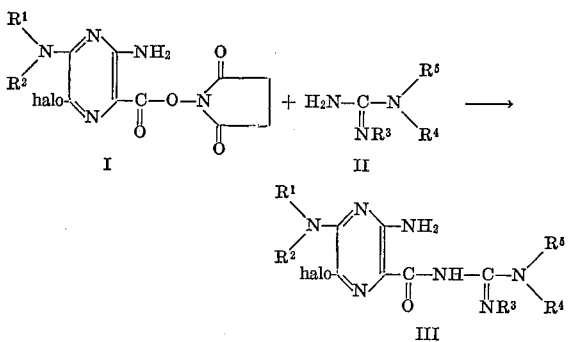

wherein in each of the foregoing structures $R^1$ represents:
(a) hydrogen,
(b) lower alkyl of from 1 to about 5 carbon atoms, e.g., methyl, ethyl, propyl, isopropyl, butyl, isobutyl, secondary butyl, tertiary butyl, pentyl, isopentyl, neopentyl and the like,
(c) lower alkenyl of from 3 to about 5 carbon atoms, e.g., allyl, 2-butenyl, and the like,
(d) lower alkynyl of from 3 to about 5 carbon atoms, e.g., propargyl and the like,
(e) lower cycloalkyl of from 3 to about 6 carbon atoms, e.g., cyclopropyl, cyclopentyl, cyclohexyl and the like,
(f) lower cycloalkyl-lower alkyl wherein the cycloalkyl moiety contains from 3 to about 6 carbon atoms and the lower alkyl moiety contains from 1 to about 3 carbon atoms e.g., cyclopropylmethyl, 1- or 2-cyclopropylethyl, 1-, 2- or 3-cyclopropylpropyl, cyclopentylmethyl, 1- or 2-cyclopentylethyl, 1-, 2-, or 3-cyclopentylpropyl, cyclohexylmethyl, 1- or 2-cyclohexylethyl, 1-, 2- or 3-cyclohexylpropyl and the like,
(g) di(lower alkyl)amino-lower alkyl, wherein each of the lower alkyl groups has from 1 to about 3 carbon atoms, and can be similar or dissimilar groups selected from methyl, ethyl, propyl and isopropyl e.g., dimethyl-, diethyl-, diisopropyl-, dipropyl-N,-methyl-N-ethyl-, N-methyl-N-propyl, N-ethyl-N-propyl-, and the like.
(h) hydroxylower alkyl, containing from 1 to about 5 hydroxyl groups and from 2 to about 6 carbon atoms e.g., 2-hydroxyethyl, 2- and 3-hydroxypropyl, pentahydroxyhexyl, and the like,
(i) ω,ω,ω-trifluoro-lower alkyl of from 1 to about 3 carbon atoms such as trifluoro-methyl, trifluoroethyl, trifluoropropyl and the like,
(j) mononuclear aryl-lower alkyl, especially phenyl-lower alkyl, wherein the lower alkyl moiety contains from 1 to about 3 carbon atoms either straight or branched chain, and the phenyl group is either unsubstituted or substituted, with such as halo, e.g., benzyl, phenethyl, 1-, 2-, or 3-phenylpropyl, fluorobenzyl, fluorophenethyl, chlorobenzyl, chlorophenethyl, and the like,
(k) heterocyclic-lower alkyl, wherein the heterocyclic moiety is a 5 or 6 membered ring, containing oxygen or nitrogen or both, such as furyl, pyridyl and the like, and the lower alkyl moiety has from 1 to 3 carbon atoms either straight or branched chain, e.g., methyl, ethyl, propyl and the like,
(l) mononuclear aryl, especially phenyl, either unsubstituted or substituted, such as with halogen, e.g., chloro and fluoro, or lower alkyl of from 1 to 3 carbons such as methyl, ethyl, propyl and the like,
(m) lower alkoxy of from 1 to about 3 carbon atoms such as methoxy, ethoxy, propoxy, isopropoxy and substituted lower alkoxy such as aryl-lower alkoxy, for example benzyloxy and the like, or
(n) amino.

$R^2$ represents:
(a) hydrogen, or
(b) lower alkyl of from 1 to about 5 carbon atoms, e.g., methyl, ethyl, propyl, isopropyl, butyl, isobutyl, secondary butyl, tertiary butyl, pentyl, isopentyl, neopentyl and the like.

$R^1$ and $R^2$, when each represents lower alkyl, may be linked together, either directly or through a hetero atom to form a cyclic structure with the nitrogen atom to which they are attached, such as 1-pyrrolidinyl, piperidino, hexahydro-1-azepinyl, 4-methyl-1-piperazinyl, and the like.

halo represents:
(a) chloro,
(b) bromo, or
(c) iodo.

R³ represents:
(a) hydrogen,
(b) lower alkyl of from 1 to about 5 carbon atoms, e.g., methyl, ethyl, propyl, isopropyl, butyl, isobutyl, secondary butyl, tertiary butyl, pentyl, isopentyl, neopentyl and the like, or
(c) mononuclear aryl, such as phenyl.

R⁴ represents:
(a) hydrogen,
(b) lower alkyl of from 1 to about 5 carbon atoms, e.g., methyl, ethyl, propyl, isopropyl, butyl, isobutyl, secondary butyl, tertiary butyl, pentyl, isopentyl, neopentyl and the like, either unsubstituted, or substituted with such as
  (1) hydroxy,
  (2) aryl, especially phenyl and naphthyl, either unsubstituted or substituted with such as halo, e.g., chloro, bromo, or fluoro or with lower alkyl, e.g., methyl, ethyl, propyl, isopropyl, and the like, or lower alkoxy of from 1 to 3 carbons, e.g., methoxy, ethoxy or propoxy,
  (3) heterocyclic radical of 5 to about 7 atoms containing 1 or more oxygen and/or nitrogen atoms, e.g., 2-, 3- or 4-pyridyl, morpholino, 1-pyrrolidyl and the like,
  (4) lower alkoxy of from 1 to about 3 carbon atoms, e.g., methoxy, ethoxy, propoxy, and the like,
(c) lower alkenyl of from 3 to about 5 carbon atoms, e.g., allyl, 2- or 3-butenyl, 2-, 3- or 4-pentenyl and the like,
(d) lower alkylideneamino such as isopropylideneamino, and the like,
(e) mononuclear aryl-lower alkylideneamino, especially phenylalkylideneamino, e.g., benzylidene-amino, and the like, or
(f) mononuclear aryl, especially phenyl, either unsubstituted or substituted such as with halo, e.g., chloro, bromo or fluoro, lower alkyl, e.g., methyl, ethyl, or propyl, or lower alkoxy, e.g., metahoxy, ethoxy, propoxy, or the like.

R⁵ represents:
(a) hydrogen, or
(b) lower alkyl of from 1 to about 5 carbon atoms e.g., methyl, ethyl, propyl, isopropyl, butyl, pentyl, isopentyl, neopentyl, and the like.

R⁴ and R⁵ when lower alkyl can be linked together, either directly or through a hetero atom to form a 5–8 atom cyclic structure with the nitrogen atom to which they are attached e.g., 1-pyrrolidinyl, piperidino, hexahydro-1-azepinyl, morpholino, and the like, and R³ and R⁴, when lower alkyl, may be linked together to form a 5–7 atom cyclic structure with the nitrogen atoms to which they are attached, e.g., a 2-(1,3-diaza-2-cycloalkene) such as, 2-(2-imidazolinyl), or 2-(1,4,5,6-tetrahydropyrimidyl), 2 - (4,5,6,7 - tetrahydro - 1H - 1,3-diazepinyl) and the like.

The products (III) prepared by the process of this invention possess diuretic properties and may be used for the treatment of edema, hypertension, and other diseases known to be responsive to diuretic therapy.

Prior to the invention of this process, pyrazinoyl-guanidines were generally prepared by treatment of a simple alkyl pyrazinoate, or a pyrazinoxazinone with a guanidine. There were instances however in which the reaction did not proceed satisfactorily because of the nature of other substituents either on the pyrazine ring or on the guanidine. In such cases, if the reaction could be made to proceed at all, it required elevated temperatures and prolonged reaction times which permitted competing reactions such as decomposition of starting materials or product, or other unwanted side reactions to become prominent and have a deleterious effect on the yield and quality of product. A search was therefore instituted for a more reactive type of pyrazinoyl derivative.

It was discovered that the novel 2,5-dioxo-1-pyrrolidinyl pyrazinoates were very reactive toward basic reagents such as the guanidines permitting facile acylation of the guanidines in good yield.

The novel process of this invention is conducted by fusing an intimate mixture of the appropriate guanidine and 2,5-dioxo-1-pyrrolidinyl pyrazinoate for a short time, usually from 2 to about 15 minutes. Temperatures up to about 200° C. are commonly required.

The novel 2,5-dioxo-1-pyrrolidinyl pyrazinoate intermediates, which form another embodiment of this invention, are prepared by condensation of a pyrazinoic acid with N-hydroxysuccinimide. The preferred condensing agents are carbodimides such as dicyclohexylcarbodiimide and the like. The condensation is conducted in a solvent for the starting materials, such as dimethyl sulfoxide, dimethyl sulfone, dimethylformamide and the like.

The pyrazinoic acids generally are prepared simply by saponification of the appropriate pyrazinoate esters.

The following examples describe the preparation of the various pyrazinoic acid starting materials, the intermediate 2,5-dioxo-1-pyrrolidinyl pyrazinoates, and the process of this invention by the preparation of several pyrazinoylguanidines.

PREPARATION OF PYRAZINOIC ACIDS

Example 1.—3,5-diamino-6-chloropyrazinoic acid

A mixture of finely ground methyl 3,5-diamino-6-chloropyrazinoate (101.31 g., 0.50 mole), isopropyl alcohol (1875 ml.) and 5% aqueous sodium hydroxide solution (625 ml.) is heated under reflux, with vigorous stirring, for one hour. Water (7500 ml.) is added to the cooled reaction mixture and the resulting clear solution is made acid to Congo red paper by the addition of concentrated hydrochloric acid. The light yellow solid which separates is collected and dried, yield 92.8 g. (98.4%), M.P. 230–1° C. (dec.). Recrystallization from dimethyl sulfoxide-water gives 3,5-diamino-6-chloropyrazinoic acid, M.P. 272° C. dec.

Analysis.—Calc'd for $C_5H_5ClN_4O_2$ (percent): C, 31.84; H, 2.67; N, 29.71. Found (percent): C, 32.10; H, 2.65; N, 29.57.

Example 2.—3-amino-5-(2-propynylamino)-6-chloropyrazinoic acid

Step A.—Preparation of methyl 3-amino-5-(2-propynylamino)-6-chloropyrazinoate: 2-propynylamine (3.60 g., 0.065 mole) is added to a suspension of methyl 3-amino-5,6-dichloropyrazinoate (7.20 g., 0.0325 mole) in dimethyl sulfoxide (80 ml.). The resulting clear solution is stirred for one hour and diluted with water (240 ml.). The solid which separates is collected and dried, 7.75 g. (99%), M.P. 160–2° C. Recrystallization from acetonitrile gives off-white prisms, M.P. 168–9° C. of methyl 3-amino-5-(2-propynylamino)-6-chloropyrazinoate.

Analysis.—Calc'd for $C_9H_9ClN_4O_2$ (percent): C, 44.92; H, 3.77; N, 23.28. Found (percent): C, 44.82; H, 3.73; N, 23.09.

Step B.—Preparation of 3-amino-5-(2-propynylamino)-6-chloropyrazinoic acid: Utilizing the procedure substantially as described in Example 1, but substituting for the methyl 3,5-diamino-6-chloropyrazinoate employed therein, an equimolar amount of methyl 3-amino-5-(2-propynylamino)-6-chloropyrazinoate there is produced 3-amino-5-(2-propynylamino)-6-chloropyrazinoic acid.

Employing substantially the same procedure as that described in Example 1, but substituting for the methyl 3,5-diamino-6-chloropyrazinoate used therein, equimolecular quantities of the methyl 3-amino-5-NR¹R²-6-halopyrazinoates described in Table I there are produced the 3-amino-5-NR¹R²-6-halopyrazinoic acids also described in Table I.

TABLE I

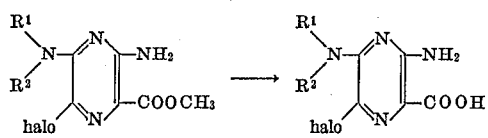

| Example | R¹ | R² | halo |
|---------|----|----|------|
| 3 | H— | H | I |
| 4 | H— | H | Br |
| 5 | CH₃— | H | Cl |
| 6 | CH₂=CH—CH₂— | H | Cl |
| 7 | (cyclopentyl)- | H | Cl |
| 8 | (cyclopropyl)-CH₂— | H | Cl |
| 9 | (CH₃)₂N(CH₂)₂— | H | Cl |
| 10 | HOCH₂CH₂— | H | Cl |
| 11 | HOCH₂—(CHOH)₄—CH₂—* | H | Cl |
| 12 | CF₃CH₂— | H | Cl |
| 13 | C₆H₅—CH₂— | H | Cl |
| 14 | (4-F-C₆H₄)—CH₂— | H | Cl |
| 15 | (furyl)-CH₂— | H | Cl |
| 16 | C₆H₅— | H | Cl |
| 17 | Cl-C₆H₄— | H | Cl |
| 18 | CH₃O— | CH₃— | Cl |
| 19 | NH₂— | CH₃— | Cl |
| 20 | CH₃— | CH₃— | Cl |
| 21 | —(CH₂)₄— | | Cl |

*Derived from D-glucamine.

PREPARATION OF 2,5-DIOXO-1-PYRROLIDINYL PYRAZINOATES

Example 22.—2,5-dioxo-1-pyrrolidinyl 3,5-diamino-6-chloropyrazinoate

To 3,5-diamino-6-chloropyrazinoic acid (from Example 1) (0.94 g., 0.005 mole) dissolved in dry dimethyl sulfoxide (15 ml.) is added N-hydroxysuccinimide (0.58 g., 0.005 mole) followed by N,N¹-dicyclohexylcarbodiimide (1.13 g., 0.0055 mole) dissolved in dry dimethyl sulfoxide (10 ml.). The dicyclohexylurea (0.92 g.) that precipitates on standing overnight at ambient temperature is filtered off and washed with ether. Additional ether is added to the filtrate to cause complete precipitation. This precipitate is collected, slurried with hot acetonitrile and again collected on a filter to yield 0.87 g. of yellow solid, M.P. above 345° C. Crystallization from dimethylformamide at —20° C. yields 0.5 g. (35%) of pure 2,5-dioxo-1-pyrrolidinyl 3,5-diamino-6-chloropyrazinoate, M.P. above 345° C.

*Analysis.*—Calc'd for $C_9H_6ClN_5O_4$ (percent): C, 37.84; H, 2.82; N, 24.52. Found (percent): C, 37.98; H, 2.89; N, 24.51.

Employing the procedure described in Example 22, but substituting for the 3,5-diamino-6-chloropyrazinoic acid utilized therein, equivalent amounts of the 3-amino-5-NR¹R²-6-halopyrazinoic acids described in Table II there are produced the 2,5-dioxo-1-pyrrolidinyl 3-amino - 5-NR¹R²-6-halopyrazinoates also described in Table II.

TABLE II

| Example | Acid from Example | R¹ | R² | halo |
|---------|-------------------|----|----|------|
| 23 | 2 | HC≡C—CH₂— | H | Cl |
| 24 | 3 | H | H | I |
| 25 | 4 | H | H | Br |
| 26 | 5 | CH₃— | H | Cl |
| 27 | 6 | CH₂=CH—CH₂— | H | Cl |
| 28 | 7 | (cyclopentyl)- | H | Cl |
| 29 | 8 | (cyclopropyl)-CH₂— | H | Cl |
| 30 | 9 | (CH₃)₂=N(CH₂)₂— | H | Cl |
| 31 | 10 | HOCH₂CH₂— | H | Cl |
| 32 | 11 | HOCH₂(CHOH)₄CH₂—* | H | Cl |
| 33 | 12 | CF₃CH₂— | H | Cl |
| 34 | 13 | C₆H₅—CH₂— | H | Cl |
| 35 | 14 | (4-F-C₆H₄)—CH₂— | H | Cl |
| 36 | 15 | (furyl)-CH₂— | H | Cl |
| 37 | 16 | C₆H₅— | H | Cl |
| 38 | 17 | Cl-C₆H₄— | H | Cl |
| 39 | 18 | CH₃O— | CH₃— | Cl |
| 40 | 19 | NH₂— | CH₃— | Cl |
| 41 | 20 | CH₃— | CH₃— | Cl |
| 42 | 21 | —(CH₂)₄— | | Cl |

*Derived from D-glucamine.

PREPARATION OF PYRAZINOYLGUANIDINES

Example 43.—3,5-diamino-6-chloropyrazinoylguanidine hydrochloride dihydrate

Guanidine (0.59 g., 0.01 mole) is prepared by refluxing guanidine hydrochloride (1.15 g., 0.012 mole) in isopropyl alcohol (30 ml.) and sodium methoxide (0.54 g., 0.01 mole) for 5 hours. The free base is isolated by filtration of the reaction mixture and evaporation of the filtrate.

2,5-dioxo-1-pyrrolidinyl 3,5-diamino-6-chloropyrazinoate (from Example 22) (0.572 g., 0.002 mole) is added to the guanidine and the resulting mixture is fused by heating with a flame for 2 to 3 minutes. The mixture is cooled and water is added whereby a yellow solid separates. The solid is collected by filtration and washed with water until the washings are neutral and then dried by washing with acetonitrile and allowing the solvent to evaporate. The solid is suspended in water (15 ml.), treated with methanesulfonic acid (2 ml.), and warmed to cause solution. Concentrated hydrochloric acid is added and the mixture is cooled. The crystalline 3,5-diamino-6-chloropyrazinoylguanidine hydrochloride dihydrate which separates is collected by filtration and dried in the air, M.P. 295° C. (dec.).

Example 44.—1-(3,5-diamino-6-chloropyrazinoyl)-2,3-diphenylguanidine

2,5-dioxo-1-pyrrolidinyl 3,5-diamino-6-chloropyrazinoate (0.572 g., 0.002 mole) (from Example 22) and 1,3-diphenylguanidine (0.464 g., 0.0022 mole) are intimately mixed and fused at 145–190° C. over a flame for 15 minutes. The mixture is cooled and slurried with water. The solids are collected by filtration, washed well with water and finally acetonitrile and air-dried. The product is crystallized from dimethylformamide to give 0.35 g. of 1-(3,5-diamino-6-chloropyrazinoyl)-2,3-diphenylguanidine, M.P. 234° C.

Employing the procedures described in Examples 43 and 44 but substituting for the 2,5-dioxo-1-pyrrolidinyl 3,5-diamino-6-chloropyrazinoate and the guanidines utilized therein, equivalent amounts of the 2,5-dioxo-1-pyrrolidinyl 3-amino-5-$NR^1R^2$-6-halopyrazinoates and the guanidines described in Table III, there are produced the 1-(3-amino-5-$NR^1R^2$-6-halopyrazinoyl)-2-$R^3$-3-$R^4$-3-$R^5$-guanidines also described in Table III.

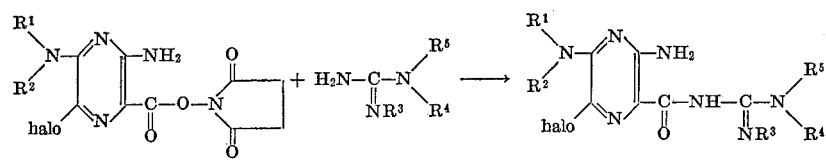

TABLE III

| Example | Starting Material from Example | $R^1$ | $R^2$ | halo | $R^3$ | $R^4$ | $R^5$ |
|---|---|---|---|---|---|---|---|
| 45 | 23 | HC≡C—CH₂— | H | Cl | H | —CH₃ | H |
| 46 | 24 | H | H | I | CH₃— | —CH₃ | H |
| 47 | 25 | H | H | Br | H | —CH₂CH₂OH | H |
| 48 | 26 | CH₃— | H | Cl | H | —CH₂—⌬ | H |
| 49 | 27 | CH₂=CH—CH₂— | H | Cl | H | —CH₂—⌬—Cl | H |
| 50 | 28 | (cyclopentyl)— | H | Cl | H | —CH₂—⌬—CH₃ | H |
| 51 | 29 | (cyclopropyl)-CH₂— | H | Cl | H | —CH₂-naphthyl | H |
| 52 | 30 | (CH₃)₂N(CH₂)₂— | H | Cl | H | —CH₂-pyridyl | H |
| 53 | 31 | HOCH₂CH₂— | H | Cl | H | —⌬ | H |
| 54 | 32 | HOCH₂(CHOH)₄CH₂— | H | Cl | H | —CH₃ | —CH₃ |
| 55 | 33 | CF₃CH₂— | H | Cl | H | —(CH₂)₅— | |
| 56 | 34 | ⌬—CH₂— | H | Cl | | —(CH₂)₂— | H |
| 57 | 35 | F-⌬—CH₂— | H | Cl | | —CH₂CH=CH₂ | H |
| 58 | 36 | (furyl)-CH₂— | H | Cl | H | —(CH₂)₃OCH₃ | H |
| 59 | 37 | ⌬— | H | Cl | H | —CH₂—⌬—OCH₃ | H |
| 60 | 38 | Cl—⌬— | H | Cl | H | —(CH₂)₃—N⌬O | H |
| 61 | 39 | CH₃O— | CH₃— | Cl | H | —⌬—F | H |
| 62 | 40 | NH₂— | CH₃— | Cl | H | —⌬—CH₃ | H |
| 63 | 41 | CH₃— | CH₃— | Cl | H | —⌬—OCH₃ | H |
| 64 | 42 | —(CH₂)₄— | | Cl | H | —(CH₂)₂—O(CH₂)₂— | |

TABLE III—Continued

| Example | Starting Material from Example | R¹ | R² | halo | R³ | R⁴ | R⁵ |
|---|---|---|---|---|---|---|---|
| 65 | 22 | H | H | Cl | H | 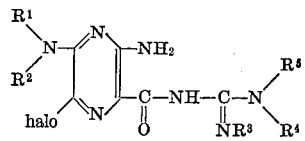 | H |
| 66 | 22 | H | H | Cl | H | 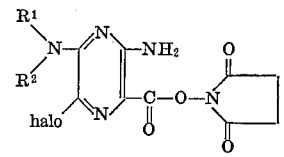 | H |

The products of the process of this invention can be administered to man or animals in the form of pills, tablets, capsules, elixirs, injectable preparations and the like and can comprise one or more of the compounds of the process of this invention as the only essential active ingredient of the pharmaceutical formulation or, as mentioned above, the novel compound(s) of the process of this invention can be combined in pharmaceutical formulations with other diuretic agents or, indeed, other therapeutic agents.

The compounds of the process of this invention are advantageously administered at a dosage range of from about 5 mg./day to about 750 mg./day or at a somewhat higher or lower dosage at the physician's discretion, preferably in subdivided amounts on a 2 to 4 times a day regimen.

The novel compounds of the process this invention can be compounded in the usual oral or parenteral dosage forms for use in therapy in the treatment of conditions resulting from an abnormal electrolyte excretion pattern of an animal organism. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing for example from 5 to 750 mg. or more or less active ingredient can be made available for the symptomatic adjustment of the dosage to the individual patient. As each of the compounds of the process of this invention can be incorporated in a dosage form similar to that described in the following example or other usual dosage form suitable for oral or parenteral administration, which can be prepared by well known methods, only one example is included herein to illustrate the preparation of a dosage forms.

Example 67

Dry filled capsule containing 50 mg. of active ingredient:

| | Per capsule, mg. |
|---|---|
| (3,5-diamino-6-chloropyrazinoyl)guanidine hydrochloride | 50 |
| Lactose | 273 |
| Magnesium stearate | 2 |
| Mixed powders | 325 |

Mix the (3,5 - diamino - 6 - chloropyrazinoyl) - guanidine hydrochloride, lactose, and magnesium stearate and reduce to a No. 60 mesh powder. Encapsulate, filling 325 mg. in each No. 2 capsule.

The above formulations can be employed to prepare compressed tablets or capsules of other novel compounds of the process of this invention hereinbefore described.

It is also contemplated to combine compounds of the process of this invention in unit dosage form with other known diuretic agents, such as, hydrochlorothiazide, 4'-methyl - 6 - chlorospiro - [2H - 1,2,4 - benzothiadiazide- 3(4H) - 1' cyclohexane] - 7 - sulfonamide - 1,1 - dioxide, trichloromethiazide, cyclopenthiazide, acetazolamide, dichlorphenamide, chlorthalidone, chlormerodrin, chlorazinil or spironolactone.

What is claimed is:

1. A process for the preparation of a compound selected from the group consisting of a compound of structural formula

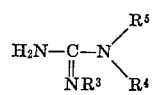

and its pharmaceutically acceptable salts and solvates which comprises the reaction of a compound of structural formula

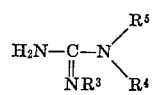

with a guanidine of formula $$H_2N-\underset{\underset{NR^3}{\|}}{C}-N\underset{R^4}{\overset{R^5}{\diagdown}}$$

wherein:
R¹ is a member selected from the group consisting of:
 (a) hydrogen,
 (b) lower alkyl,
 (c) lower alkenyl,
 (d) lower alkynyl,
 (e) $C_{3-6}$ cycloalkyl,
 (f) $C_{3-6}$ cycloalkyl-lower alkyl,
 (g) di(lower alkyl)aminomethyl-lower alkyl,
 (h) hydroxy-lower alkyl,
 (i) ω,ω,ω-trifluoro-lower alkyl,
 (j) phenyl-lower alkyl,
 (k) halophenyl-lower alkyl,
 (l) furyl-lower alkyl,
 (m) pyridyl-lower alkyl,
 (n) phenyl,
 (o) halophenyl,
 (p) lower alkylphenyl,
 (q) lower alkoxy, and
 (r) amino;
R² is a member selected from the group consisting of:
 (a) hydrogen, and
 (b) lower alkyl;
R¹ and R², when each represents lower alkyl, can be linked together to form an azacyclic structure with the nitrogen atom to which they are attached;
halo is a member selected from the group consisting of:
 (a) chloro,
 (b) bromo, and
 (c) iodo;
R³ is a member selected from the group consisting of:
 (a) hydrogen, and
 (b) lower alkyl;

$R^4$ is a member selected from the group consisting of:
(a) hydrogen,
(b) lower alkyl,
(c) hydroxy-lower alkyl,
(d) phenyl-lower alkyl,
(e) halophenyl-lower alkyl,
(f) lower alkyl-phenyl-lower alkyl,
(g) naphthyl-lower alkyl,
(h) pyridyl-lower alkyl,
(i) morpholino-lower alkyl,
(j) furyl-lower alkyl,
(k) lower alkoxy-lower alkyl,
(l) lower alkenyl,
(m) lower alkylideneamino,
(n) phenyl-lower alkylideneamino,
(o) phenyl,
(p) lower alkyl-phenyl,
(q) lower alkoxy-phenyl,
(r) halophenyl, and
(s) lower alkoxy-phenyl-lower alkyl;

$R^5$ is a member selected from the group consisting of:
(a) hydrogen, and
(b) lower alkyl;

$R^4$ and $R^5$ when lower alkyl, can be linked together to form with the nitrogen atom to which they are attached, a heterocyclic ring; and $R^3$ and $R^4$ (or $R^5$) when lower alkyl, can be linked together to form with the nitrogen atoms to which they are attached, a heterocyclic ring.

2. The process as claimed in claim 1, wherein $R^1$ and $R^2$ are each selected from the group consisting of hydrogen and lower alkyl, halo is chloro, and $R^3$, $R^4$ and $R^5$ are each hydrogen.

3. A process as claimed in claim 1 wherein in each of the reactants $R^1$, $R^2$, $R^3$, $R^4$, and $R^5$ each represent hydogen, halo represents chloro and the product obtained is 3,5-diamino-6-chloropyrazinoylguanidine.

4. A process as claimed in claim 1 wherein in the reactants, $R^1$ and $R^2$ each represent methyl, $R^3$, $R^4$, and $R^5$ each represent hydrogen, halo represents chloro and the end product obtained is 3-amino-5-diethylamino-6-chloropyrazinoylguanidine.

5. The compound of structural formula

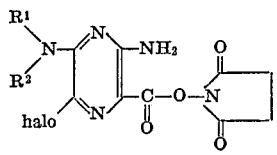

wherein $R^1$ is a member selected from the group consisting of:
(a) hydrogen
(a) hydrogen,
(b) lower alkyl,
(c) lower alkenyl,
(d) lower alkynyl,
(e) $C_{3-6}$ cycloalkyl,
(f) $C_{3-6}$ cycloalkyl-lower alkyl,
(g) di(lower alkyl)aminomethyl-lower alkyl,
(h) hydroxyl-lower alkyl,
(i) $\omega,\omega,\omega$-trifluoro-lower alkyl,
(j) phenyl-lower alkyl,
(k) halophenyl-lower alkyl,
(l) furyl-lower alkyl,
(m) pyridyl-lower alkyl,
(n) phenyl,
(o) halophenyl,
(p) lower alkylphenyl,
(q) lower alkoxy, and
(r) amino;

$R^2$ is a member selectedd from the group consisting of:
(a) hydrogen, and
(b) lower alkyl;

$R^1$ and $R^2$, when each represents lower alkyl, can be linked together to form an azacyclic structure with the nitrogen atom to which they are attached;

halo is a member selected from the group consisting of:
(a) chloro,
(b) bromo, and
(c) iodo.

6. The compound as claimed in claim 5 wherein $R^1$ and $R^2$ are each selected from the group consisting of hydrogen and lower alkyl, and halo is chloro.

7. 2,5-dioxo - 1 - pyrrolidinyl 3,5-diamino - 6 - chloropyrazinoate.

8. 2,5-dioxo-1-pyrrolidinyl 3-amino-5-dimethylamino-6-chloropyrazinoate.

References Cited
UNITED STATES PATENTS 3,299,063   1/1967   Cragoe et al. _____ 260—250

NICHOLAS S. RIZZO, Primary Examiner

U.S. Cl. X.R.

260—247.2; 424—250